UNITED STATES PATENT OFFICE.

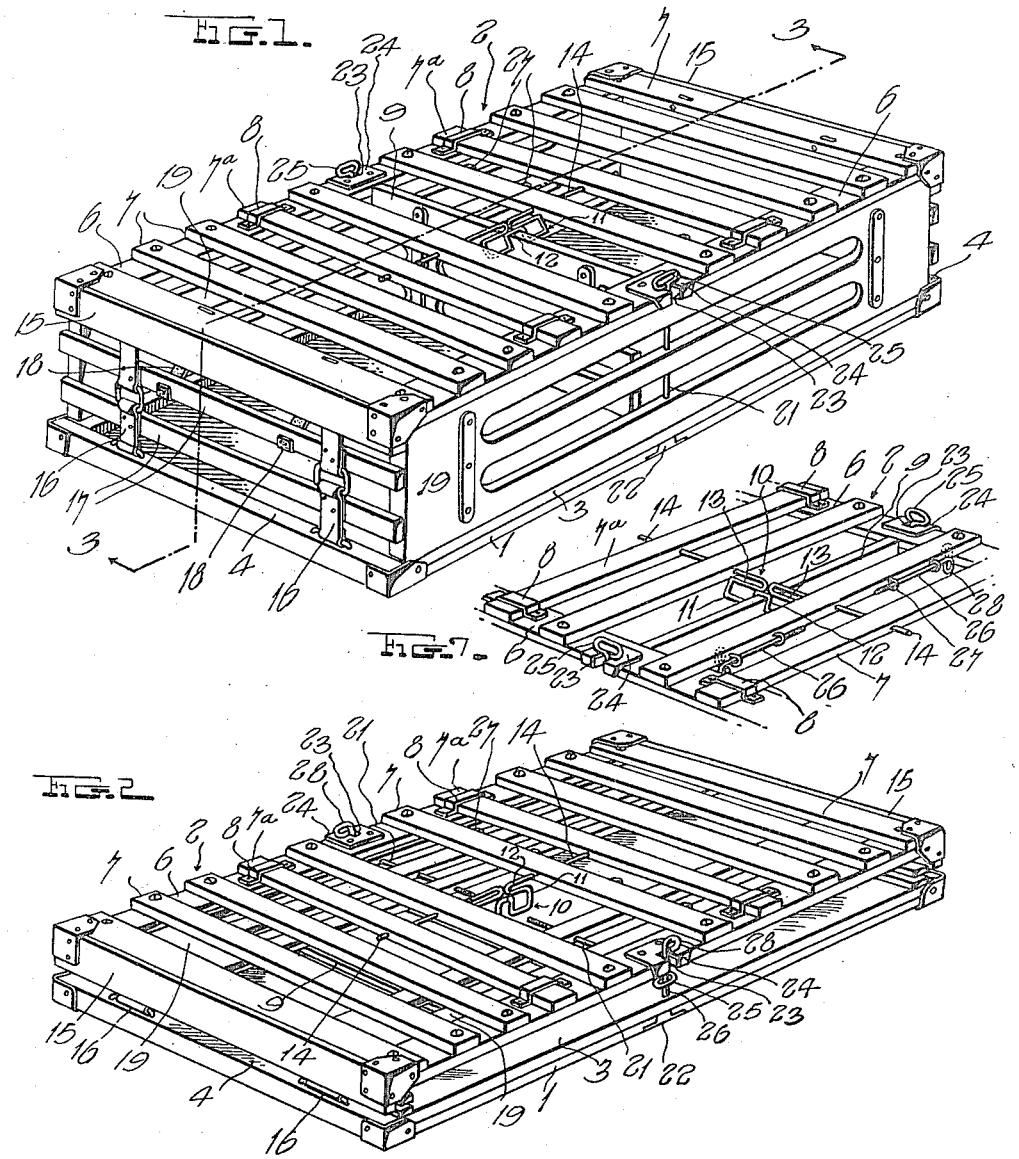

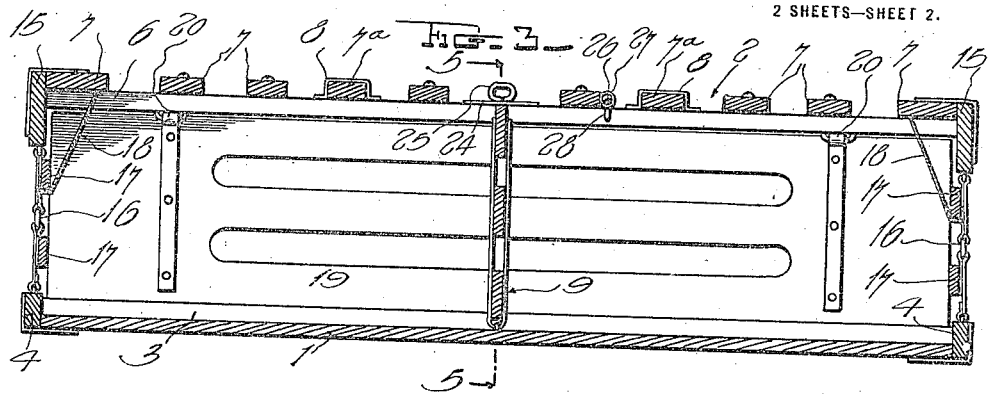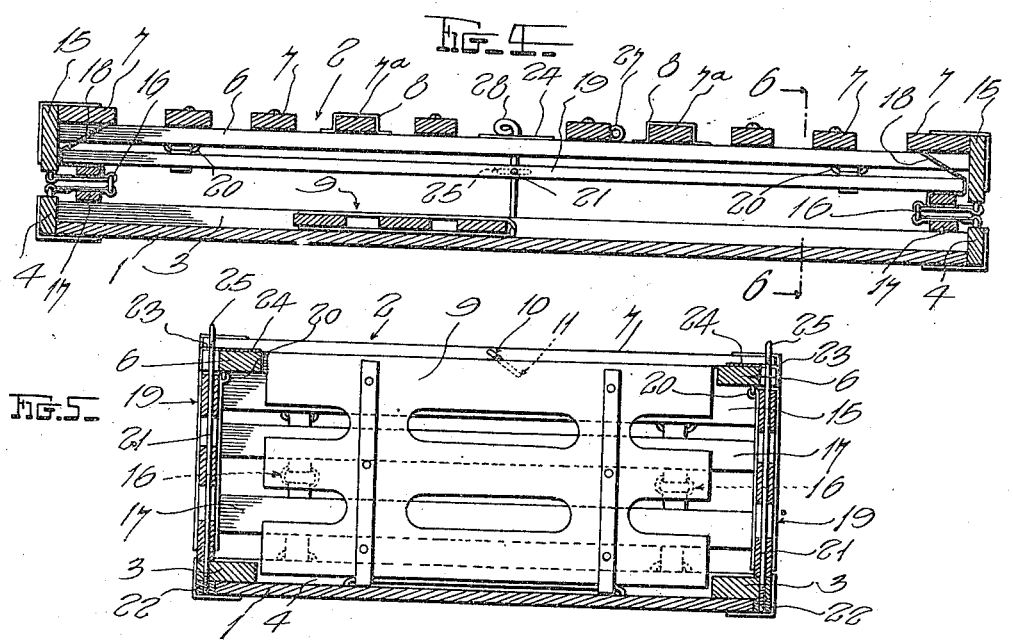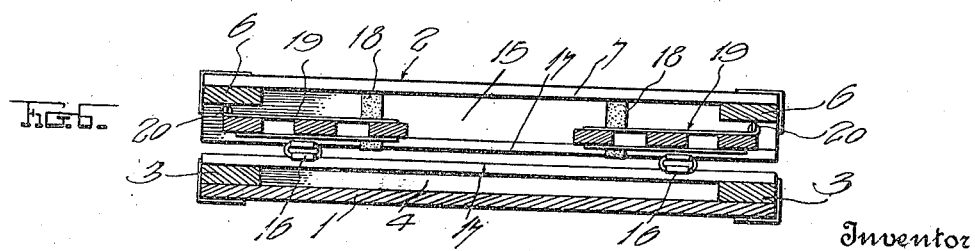

JOHN D. STIRES, OF COLUMBUS, NEBRASKA.

FOLDING CRATE.

1,240,097.  Specification of Letters Patent.  Patented Sept. 11, 1917.

Application filed February 19, 1917. Serial No. 149,621.

*To all whom it may concern:*

Be it known that I, JOHN D. STIRES, a citizen of the United States, residing at Columbus, in the county of Platte and State of Nebraska, have invented certain new and useful Improvements in Folding Crates; and I do declare the following to be a full, clear, and exact description of the invention, such as will enable others skilled in the art to which it appertains to make and use the same.

My invention has for its object to provide a simply constructed and inexpensive foldable crate having novel means whereby it is held in either folded or operative position, the invention also contemplating the provision of a novel form of fastening means for securing two removable slats and a folding partition in place.

With the foregoing general object in view, the invention resides in certain novel features of construction and unique combinations of parts to be hereinafter fully described and claimed, the descriptive matter being supplemented by the accompanying drawings which constitute a part of this application and in which:

Figure 1 is a perspective view of the crate in extended position;

Fig. 2 is a similar view of the crate folded for return shipment;

Fig. 3 is a longitudinal section on the plane indicated by the line 3—3 of Fig. 1;

Fig. 4 is a similar view with the crate folded;

Fig. 5 is a vertical transverse section on the plane of the line 5—5 of Fig. 3;

Fig. 6 is a similar view with the crate folded, this view being cut on the plane of the line 6—6 of Fig. 4; and Fig. 7 is a detail perspective showing more particularly the manner in which the locking screws are normally carried.

In the drawings above briefly described, the numerals 1 and 2 designate respectively the bottom and top of the improved crate, said bottom being preferably of solid formation with cleats 3 and 4 extending along its side and end edges respectively and rising above the upper surface of said bottom. The top 2, however, is constructed of a pair of side bars 6 and slats 7 and 7ª extending between them, all of said slats 7 being secured rigidly to the bars 6 whereas the slats 7ª extend slidably through arched guides 9 which are secured to said bars. The slats 7ª are thus removable for giving access to either end of the crate, the latter being divided transversely by a central transverse partition 9 hinged to the bottom 1.

A locking member 10 is provided for securing the partition 9 as well as the slats 7ª in operative position, said member having at its center an elongated loop 11 whose ends abut the inner edges of the two slats 7 adjacent the center of the crate, one side of said loop being bent inwardly at 12 to form a seat receiving the upper edge of the partition 9 to maintain the latter in upright position. The device 10 is formed preferably of a single rod bent to form the loop 11 and seat 12, and directly opposite said seat, the end portions of the rod are bent inwardly at substantially right angles to the loop as shown at 13, said ends being then bent outwardly in opposite directions to form a pair of locking bolts 14 sliding through transverse openings in the slats 7 adjacent the loop 11 and into other openings in the slats 7ª. It will thus be observed that the single device 10 effectively holds the slats 7ª and the partition 9 in operative position until the loop 11 is raised. When this is done, however, said loop is positioned above the slats and may thus be shifted endwise in either direction to retract either bolt 14.

The endmost slats 7 are preferably provided on their outer edges with cleats 15 disposed above the cleats 4 and hinges 16 are pivoted at their opposite ends to said cleats 4 and 15. Slats 17 are secured to the hinges 16 and coöperate therewith in forming inwardly foldable ends for the crate which are held against outward movement by the flexible straps 18 which are secured at one end to the upper slats 17 and at their other ends to the outermost slats 7.

A pair of suitable sides 19 are hinged at 20 to the side bars 6 of the top 2, said sides abutting the ends of the crate when in operative position to hold said ends against inward folding. However, when the sides 19 are swung inwardly to the position shown in Fig. 6, said ends may likewise fold inwardly and thus permit the top and bottom of the crate to move toward each other to decrease the size of the device for return shipment.

When the sides 19 are in operative position, vertical rods 21 are provided for preventing movement thereof, said rods being threaded into nuts 22 at their lower ends while their upper ends are received in notches 23 of a pair of plates 24 secured to the centers of the bars 6, said bars being formed with notches registering with said notches 23. The nuts 22 are inset in the lower side of the bottom 1 and it will thus be obvious that when the rods 21 are threaded into said nuts, the entire crate will be effectively held in operative position. The upper ends of the rods 21 are preferably provided with eyes 25 by means of which they may be rotated by hand and said eyes also serve to receive locking screws 26 when the crate is folded.

Ordinarily, that is, when the crate is in use, the screws 26 are received in eyes 27 on the edge of one of the slats 7, said screws having at one end eccentric heads 28 which drop by gravity as shown in Fig. 7 and abut the inner edges of the side bars 6 to prevent removal of said screws until they are first turned to the position shown in dotted lines in said figure.

When the crate is collapsed (see Fig. 2) the eyes 25 are located between the notches 23 and the nuts 22 and the screws 26 are then removed and passed through said notches and eyes, being threaded into the nuts as illustrated in Fig. 2. Not only are the top and bottom of the crate secured together by the use of these screws, but the rods 21 are held against loss and maintained in proper position for use when necessary.

From the foregoing, taken in connection with the accompanying drawings, it will be clear that although the invention is of simple nature, it will be of great advantage for numerous shipping purposes, the type of crate shown being adapted primarily for poultry, although it will be understood that the device may be constructed in other forms for different purposes.

On account of the advantages derived from the construction shown, it constitutes the preferred form of the crate but it is to be understood that within the scope of the invention as claimed, numerous minor changes may be made.

I claim:

1. A folding crate comprising a top and bottom, inwardly folding hingedly mounted ends and sides, locking rods carried by said sides and extending transversely across the same for securing them in operative position, and other locking devices for securing the top and bottom of the crate together when folded and at the same time for preventing removal of said rods.

2. A folding crate comprising a top and bottom, inwardly folding hingedly mounted ends and sides, locking rods carried by said sides and extending transversely across the same for securing them in operative position, said rods having eyes at one end, and other locking devices for securing the top and bottom of the crate together when folded, said devices passing through said eyes to prevent removal of said locking rods.

3. A folding crate comprising a top, a bottom, and inwardly folding hingedly mounted ends and sides, locking rods carried by and extending transversely of said sides for securing them in operative position, coacting means on one end of said rods and on the bottom of the crate for holding said rods in place, the other ends of said rods having eyes, and other locking devices for connecting said bottom and top when folded, said devices having means for coöperation with the aforesaid means on the bottom and having portions to pass through said eyes.

4. A folding crate comprising a bottom, a top, and inwardly folding ends and sides, locking rods carried by and extending transversely of said sides, said rods having screw threads on their lower ends and eyes on their upper ends, nuts carried by the bottom for receiving said threaded lower ends of the rods, and locking screws adapted to pass through the aforesaid eyes and to be threaded into said nuts when the crate is folded, whereby said screws will retain the crate in collapsed position and at the same time prevent removal of said rods.

5. A folding crate comprising a top, a bottom, and inwardly folding ends and sides, locking rods carried by and extending transversely of said sides, the lower ends of said rods being screw threaded, the upper ends thereof having operating handles, nuts carried by the bottom to receive the threaded ends of said rods, and locking screws adapted to engage said operating handles and to be threaded into said nuts to hold the top and bottom of the crate in close relation when folded.

In testimony whereof I have hereunto set my hand in the presence of two subscribing witnesses.

JOHN D. STIRES.

Witnesses:
  E. S. NEWLAN,
  C. W. BOWLBY.

Copies of this patent may be obtained for five cents each, by addressing the "Commissioner of Patents, Washington, D. C."